US012673281B2

(12) United States Patent (10) Patent No.: US 12,673,281 B2
Moon et al. (45) Date of Patent: Jul. 7, 2026

(54) WATER PURIFIER

(71) Applicant: COWAY CO., LTD., Gongju-si (KR)

(72) Inventors: Hyoungmin Moon, Seoul (KR); Doo Won Han, Seoul (KR); Sung Han Yun, Seoul (KR); Won Tae Kim, Seoul (KR)

(73) Assignee: COWAY CO., LTD., Gongju-si (KR)

( * ) Notice: Subject to any disclaimer, the term of this patent is extended or adjusted under 35 U.S.C. 154(b) by 415 days.

(21) Appl. No.: 18/568,872

(22) PCT Filed: Jun. 16, 2022

(86) PCT No.: PCT/KR2022/008511
§ 371 (c)(1),
(2) Date: Dec. 11, 2023

(87) PCT Pub. No.: WO2022/270819
PCT Pub. Date: Dec. 29, 2022

(65) Prior Publication Data
US 2024/0278154 A1 Aug. 22, 2024

(30) Foreign Application Priority Data
Jun. 21, 2021 (KR) ........................ 10-2021-0080268

(51) Int. Cl.
*B01D 35/157* (2006.01)
*B01D 35/16* (2006.01)
(Continued)

(52) U.S. Cl.
CPC ......... *B01D 35/1573* (2013.01); *B01D 35/16* (2013.01); *B01D 37/04* (2013.01);
(Continued)

(58) Field of Classification Search
CPC .......... B01D 2313/18; B01D 2313/208; B01D 2313/48; B01D 2313/50; B01D 2313/501;
(Continued)

(56) References Cited

U.S. PATENT DOCUMENTS

2017/0014769 A1 1/2017 Kwon et al.

FOREIGN PATENT DOCUMENTS

KR 10-2016-0115576 A 10/2016
KR 10-2017-0067579 A 6/2017
(Continued)

OTHER PUBLICATIONS

International Search Report issued Sep. 15, 2022 in PCT/KR2022/008511 filed on Jun. 16, 2022, 7 pages (with English Translation).

*Primary Examiner* — Dirk R Bass
(74) *Attorney, Agent, or Firm* — Oblon, McClelland, Maier & Neustadt, L.L.P.

(57) ABSTRACT
A water purifier comprises: an RO filter comprising a non-filtering unit, a filtering unit for discharging purified water, and a reverse osmosis membrane for partitioning the non-filtering unit and the filtering unit and for purifying the raw water; a raw water storage unit; a purified water storage unit; a water storage tank comprising a separator membrane made of a non-permeable material so as to independently partition the raw water storage unit and the purified water storage unit and to have elasticity, the water storage tank being configured such that, when the raw water storage unit expands, the purified water storage unit contracts, and when the purified water storage unit expands, the raw water storage unit contracts; a flow channel for providing passages along which the raw water and the purified water flow; a valve unit comprising multiple valve modules; and a control device for controlling valve modules.

7 Claims, 4 Drawing Sheets

(51) Int. Cl.
  *B01D 37/04*        (2006.01)
  *B01D 61/02*        (2006.01)
  *B01D 61/12*        (2006.01)
  *B01D 65/02*        (2006.01)
(52) U.S. Cl.
  CPC ........... *B01D 61/025* (2013.01); *B01D 61/12*
    (2013.01); *B01D 65/02* (2013.01)
(58) Field of Classification Search
  CPC .............. B01D 2321/02; B01D 35/157; B01D
    35/1573; B01D 35/16; B01D 37/04;
    B01D 61/02; B01D 61/025; B01D 61/04;
    B01D 61/08; B01D 61/10; B01D 61/12;
    B01D 65/02; C02F 1/00; C02F 1/44
  See application file for complete search history.

(56)                References Cited

FOREIGN PATENT DOCUMENTS

| KR | 10-2017-0116808 A | 10/2017 |
| KR | 10-2019-0097801 A | 8/2019 |
| KR | 10-2022-0111593 A | 8/2022 |

WATER PURIFIER

TECHNICAL FIELD

The present invention relates to a water purifier.

BACKGROUND ART

In general, a water purifier is a device that receives raw water from a raw water source such as a tap, filters the raw water into purified water through a filter provided therein-side, and then provides the purified water to users. Additionally, purified water may be provided to users as cold water cooled to a predetermined temperature or lower or hot water heated to a predetermined temperature or higher by a water purifier.

Such a conventional water purifier includes a reverse osmosis (RO) filter as a filter for filtering raw water. The RO filter may include a non-filtering unit into which raw water can flow, a reverse osmosis membrane that can filter raw water, and a filtering unit that receives purified water filtered by the reverse osmosis membrane. In other words, some of the raw water is filtered by the reverse osmosis membrane to become purified water and accommodated in the filtering unit, while the remaining unfiltered water becomes concentrated water containing impurities and is accommodated in the non-filtering unit.

In this regard, Korean Patent Publication No. 10-0610236 "Concentrated water discharge reduction device of reverse osmosis water purifier" (Patent Document 1) by the present applicant discloses a reverse osmosis water purifier in which raw water is flushed to clean the reverse osmosis membrane for a predetermined period of time. Such a reverse osmosis water purifier has the problem of reduced flushing efficiency in areas with high levels of raw water contamination.

Korean Patent Publication 10-1804485 "Purification system equipped with membrane cleaning device including reverse osmosis membrane filter" (Patent Document 2) by Picogram Co., Ltd. discloses a water purification system including a water storage tank (flushing tank) that accommodates purified water for flushing the filter. Such a water purification system performs flushing using purified water, and thus hygiene can be improved. However, the water purification system of Patent Document 2 is difficult to completely improve contamination of flushing water and has problems related to ensuring the pressure required for flushing.

First, in the water purification system of Patent Document 2, if the flushing tank is sealed, it may be difficult for purified water to flow into the flushing tank due to internal air pressure. Accordingly, the flushing tank may require communication with the outside air. In this case, purified water stored in the flushing tank may be exposed to contaminants such as viruses contained in the outside air.

Second, a separate pump may be required to provide the pressure necessary to clean the RO filter. If the water purification system is equipped with a separate pump, noise may occur due to operation. Additionally, the cost for additional pump configuration, the complexity of the water purification system, and the size of the water purification system may increase. Accordingly, a structure that ensures the hygiene of purified water stored in the flushing tank and provides the hydraulic pressure required to clean the RO filter without a pump is required.

Third, an additional pump may be required to discharge purified water stored in a first water storage unit through a purified water outlet. As described above, if a separate pump is provided in the water purification system, noise may occur due to operation. Additionally, the cost for additional pump configuration, the complexity of the water purification system, and the size of the water purification system may increase. Accordingly, a structure in which purified water can be discharged only through the flow of raw water without a pump is required. Korean Patent Publication No. 10-1837620 "Water treatment device" (Patent Document 3) by the present applicant discloses a water treatment device including a storage unit in which a storage member contacts or expands to flow residential water and purified water discharged from a reverse osmosis filter.

However, the storage unit of the water treatment device disclosed in Patent Document 3 is provided as a purified water tank and is not a flushing tank for flushing the reverse osmosis filter. Therefore, Patent Document 3 does not consider at all the method of providing pressure necessary to clean the reverse osmosis filter and the method of improving the hygiene of flushing water.

Additionally, according to Patent Document 3, in order for the purified water in the storage unit to be discharged to the outside, residential water discharged from the reverse osmosis filter needs to flow in. In other words, in Patent Document 3, there is a problem that raw water to be generated as purified water is required and raw water to be converted to residential water is additionally required to discharge the purified water stored in the storage unit. Therefore, since residential water must flow from the filter separately from generation of purified water each time purified water is discharged, raw water that will not be filtered into purified water is wasted unnecessarily and the flow rate of water unnecessarily flowing through the filter also increases, resulting in deterioration of durability of the filter. Moreover, since residential water is produced through a filter, water pressure or flow rate may be limited. In other words, the residential water discharged from the filter has a lower water pressure compared to the amount of raw water flowing into the water purifier and the amount of the residential water is not greater than the amount of the raw water, and thus when the residential water flows into the storage unit and discharges purified water, there is a problem that the amount of purified water discharged decreases.

PRIOR ART LITERATURE (Patent Document 1) Korean Patent Publication 10-0610236 (registered on Aug. 1, 2006)

(Patent Document 2) Korean Patent Publication 10-1804485 (registered on Nov. 28, 2017)

(Patent Document 3) Korean Patent Publication 10-1837620 (registered on Mar. 6, 2018)

DETAILED DESCRIPTION OF INVENTION

Technical Problems

An object of one embodiment of the present invention devised in view of the above circumstances is to provide a water purifier including a water storage tank in which purified water for flushing an RO filter is stored, which can reduce the possibility of contamination of the purified water stored in the water storage tank.

Additionally, an object of one embodiment of the present invention is to provide a water purifier in which a pressure required in a flushing mode and a purified water discharge mode can be provided to the water storage tank without a separate pump.

Additionally, an object of one embodiment of the present invention is to provide a water purifier capable of recycling wasted water.

Additionally, an object of one embodiment of the present invention is to provide a water purifier capable of reducing the amount of raw water used.

Additionally, an object of one embodiment of the present invention is to provide a water purifier capable of lowering the concentration of contaminants in raw water filtered by an RO filter.

Technical Solution

In accordance with one embodiment of the present disclosure, there is provided a water purifier comprising: an RO filter including a non-filtering unit into which raw water flows, a filtering unit for discharging purified water, and a reverse osmosis membrane that partitions the non-filtering unit and the filtering unit and filters the raw water into the purified water; a raw water storage unit in which the raw water is stored; a purified water storage unit in which the purified water discharged from the filtering unit is stored; a water storage tank including a separator membrane made of a non-permeable material to independently partition the raw water storage unit and the purified water storage unit and having elasticity, the water storage tank being configured such that the purified water storage unit contracts when the raw water storage unit expands and the raw water storage unit contracts when the purified water storage unit expands; a flow channel providing passages through which the raw water and the purified water flow; a valve unit including a plurality of valve modules selectively opened/closed to control flow of the raw water and the purified water in the flow channel; and a control device for controlling opening and closing of the plurality of valve modules based on a plurality of flow modes, wherein the plurality of flow modes includes a purified water storage mode in which the purified water is stored in the purified water storage unit, wherein the plurality of valve modules is opened/closed such that the raw water flows into the non-filtering unit and the purified water discharged from the filtering unit flows into the purified water storage unit in the purified water storage mode.

Further, the plurality of flow modes may further include a purified water discharge mode in which the purified water stored in the purified water storage unit is discharged to the outside, wherein the plurality of valve modules is opened and closed such that the raw water flows into the raw water storage unit, and the purified water storage unit contracts due to expansion of the raw water storage unit and thus the purified water discharged from the purified water storage unit is discharged to the outside in the purified water discharge mode, and the raw water flows into the raw water storage unit without passing through the RO filter in the purified water discharge mode.

Further, the flow channel may further include a raw water discharge passage providing a passage through which the raw water is discharged from the raw water storage unit and discharged to the outside in the purified water storage mode.

Further, the flow channel may further include a residential water discharge passage providing a passage for discharging residential water discharged from the non-filtering unit, the residential water discharge passage being joined to the raw water discharge passage.

Further, the plurality of flow modes may further include a flushing mode in which the reverse osmosis membrane is cleaned with the purified water stored in the purified water storage unit, and wherein the plurality of valve modules is opened and closed such that the raw water flows into the raw water storage unit and the purified water discharged from the purified water storage unit flows into the non-filtering unit in the flushing mode.

Further, the flow channel may further include: an RO filter inflow passage providing a passage through which any one of the raw water or the purified water flows into the non-filtering unit; a first tank passage providing a passage through which the raw water flows into the raw water storage unit; a second tank passage providing a passage through which the purified water discharged from the purified water storage unit flows in, the second tank passage being joined to the RO filter inflow passage; a purified water storage passage providing a passage through which the purified water discharged from the filtering unit flows in, and the purified water storage passage being joined to the second tank passage; and a purified water discharge passage providing a passage through which the purified water is discharged from the purified water storage unit and discharged to the outside, and the purified water discharge passage being joined to the purified water storage passage.

Further, the water purifier may further include a pump provided on the RO filter inflow passage to pressurize the raw water flowing in the RO filter inflow passage.

Further, the flow channel may include a return passage for returning water discharged from the non-filtering unit of the RO filter to the non-filtering unit, the purified water is accommodated in the non-filtering unit in a case in which the flushing mode ends, the purified water storage mode is performed after the flushing mode, and the plurality of valve modules is opened/closed such that the purified water is discharged from the non-filtering unit and flows into the non-filtering unit along with the raw water through the return passage in the purified water storage mode.

Effect of Invention

According to one aspect of the present invention, since the RO filter is cleaned using purified water stored in the water storage tank, impurities can be prevented from being adsorbed to the reverse osmosis membrane of the RO filter in the flushing mode.

In addition, since the raw water storage unit may expand and the purified water storage unit may contract to discharge purified water when raw water flows into the water storage tank, the pressure required for the flushing mode and the purified water discharge mode can be provided without a separate pump.

In addition, since residential water can be recirculated through the RO filter and filtered into purified water, there wasted water can be recycled.

In addition, according to an embodiment of the present invention, the flow rate of raw water flowing into the water purifier is the same as the flow rate of raw water discharged from the water purifier in the purified water discharge mode, which has the effect of preventing unnecessary consumption of raw water.

In addition, after operation the flushing mode, purified water can be accommodated in the non-filtering unit of the RO filter during the initial operation of the purified water storage mode, which has the effect of lowering the concentration of contaminants in the raw water filtered by the RO filter.

BEST MODE FOR CARRYING OUT THE INVENTION

Hereinafter, a specific embodiment of the present disclosure for implementing the idea of the present disclosure will be described in more detail with reference to the accompanying drawings.

Further, in describing the present disclosure, when it is determined that detailed descriptions of known configurations or functions may obscure the gist of the present disclosure, the detailed descriptions will be omitted.

When an element is referred to as being 'connected to', 'supplied to', or 'moved to' another element, it should be understood that the element may be directly connected to, supplied to, or moved to the other element, but that other elements may exist between the elements.

The terms used in the present specification are only used for describing the specific embodiment, and are not intended to limit the present disclosure. Singular expressions include plural expressions unless the context clearly indicates otherwise.

In addition, it should be noted in advance that expressions such as upper, lower, and side in the present specification are explained based on the drawings, and may be expressed differently if the direction of the corresponding object changes. For the same reason, in the accompanying drawings, some components are exaggerated, omitted, or schematically shown, and the size of each component does not entirely reflect the actual size.

The terms including ordinal numbers, such as first, second, etc., may be used for describing various elements, but the corresponding elements are not limited by these terms. These terms are only used for the purpose of distinguishing one element from another element.

The meaning of "including" used in the present specification specifies specific features, regions, integers, steps, operations, elements and/or components, and does not exclude the presence or addition of other specific features, regions, integers, steps, operations, elements, components, and/or groups.

Hereinafter, a water purifier 1 according to an embodiment of the present invention will be described with reference to the drawings.

Figure 1:
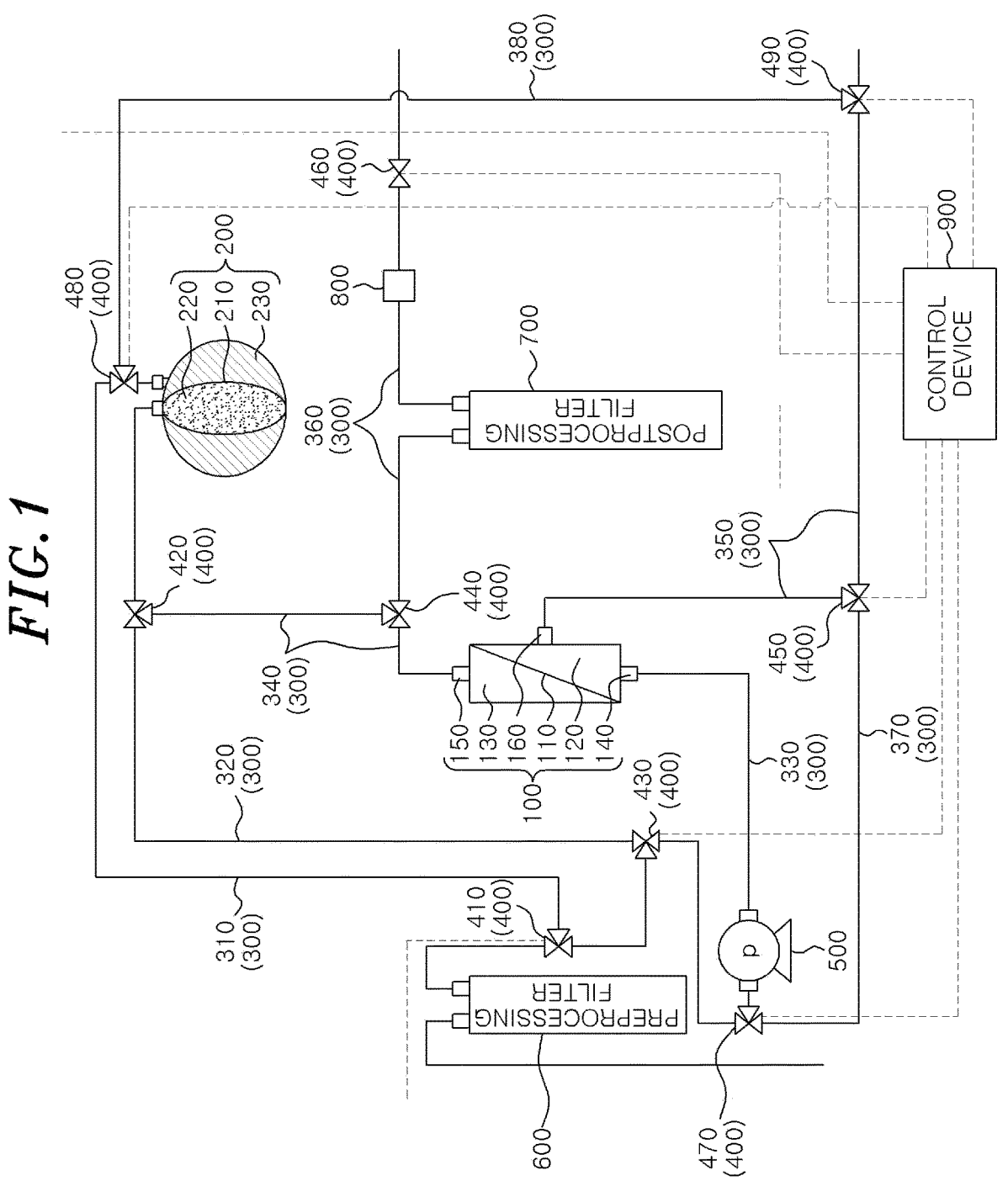
FIG. 1 is a diagram showing a water purifier according to an embodiment of the present invention.

Referring to FIG. 1, the water purifier 1 according to an embodiment of the present invention can provide clean water to users by filtering water supplied from the outside. For example, the water purifier 1 can receive water from a water source (not shown) such as a tap, and filter the supplied water into clean water. The water purifier 1 controls the flow of water therein on the basis of a plurality of flow modes. The water purifier 1 includes an RO filter 100, a water storage tank 200, a flow channel 300, a valve unit 400, a pump 500, a preprocessing filter 600, a postprocessing filter 700, a flow sensor 800, and a control device 900.

The RO filter 100 can filter some of raw water flowing thereinto and provide the filtered water as purified water and provide the remaining unfiltered water as residential water. In this specification, raw water is defined as water before filtration in the RO filter 100 regardless of whether it is filtered in the preprocessing filter 600, and purified water is defined as water that has been filtered in the RO filter 100 regardless of whether it is filtered in the postprocessing filter 700. Flushing water may be purified water stored in the water storage tank 200 for flushing the RO filter 100. Residential water is defined as the remaining water that cannot be discharged as purified water after flowing into the RO filter 100. Additionally, flushing discharge water is defined as water that has flowed into the RO filter 100 and has flushed the RO filter 100.

The RO filter 100 may include a reverse osmosis membrane 110, a non-filtering unit 120, a filtering unit 130, a filter inlet 140, a purified water discharge port 150, and a residential water outlet 160.

The reverse osmosis membrane 110 partitions the non-filtering unit 120 and the filtering unit 130 and can filter raw water into purified water. In other words, some of raw water flowing into the RO filter 100 may be filtered by the reverse osmosis membrane 110 and discharged through the purified water discharge port 150 as purified water, and the rest may be discharged through the residential water outlet 160 as residential water that has not penetrated the reverse osmosis membrane 110.

The non-filtering unit 120 is connected to the filter inlet 140 and is a space for accommodation of raw water (purified water storage mode) or purified water (flushing mode) flowing thereinto through the filter inlet 140. Additionally, the non-filtering unit 120 may be connected to the residential water outlet 160. In this non-filtering unit 120, impurities contained in the raw water may be accumulated without passing through the reverse osmosis membrane 110. Residential water containing impurities accumulated in the non-filtering unit 120 may be discharged to the outside of the RO filter 100 through the residential water outlet 160. Although a significant amount of impurities flowing into the RO filter 100 is discharged to the outside of the RO filter 100 through discharge of residential water, some impurities may be adsorbed on the reverse osmosis membrane 110 and may not be discharged when residential water is discharged. Impurities adsorbed on the reverse osmosis membrane 110 may be flushed out through purified water flowing into the non-filtering unit 120 and separated from the reverse osmosis membrane 110. In other words, the non-filtering unit 120 and the reverse osmosis membrane 110 can be cleaned by purified water flowing into the non-filtering unit 120.

The filtering unit 130 is a space where purified water filtered by the reverse osmosis membrane 110 is accommodated. Additionally, the filtering unit 130 communicates with the purified water discharge port 150, and purified water in the filtering unit 130 may flow into the water storage tank 200 through the purified water discharge port 150.

The filter inlet 140 is a through hole for communicating the non-filtering unit 120 with an RO filter inflow passage 330 of the flow channel 300, which will be described later. Purified water or raw water flowing in the RO filter inflow passage 330 may flow into the non-filtering unit 120 through the filter inlet 140.

The purified water discharge port 150 is a through hole for discharging purified water filtered through the reverse osmosis membrane 110 to the outside of the RO filter 100. Purified water in the filtering unit 130 may be discharged through the purified water discharge port 150 to a purified water storage passage 340 of the flow channel 300, which will be described later.

The residential water outlet 160 is a through hole for discharging the residential water contained in the non-filtering unit 120 to a residential water discharge passage 350. In addition, the residential water outlet 160 can allow purified water flowing into the non-filtering unit 120 to flush the reverse osmosis membrane 110 and the non-filtering unit 120, and allow the purified water used for flushing to be discharged as flushing discharge water to the outside through the residential water discharge passage 350 of the flow channel 300, which will be described later.

The water storage tank 200 stores one or more of raw water and purified water, and can discharge one of the raw water and purified water to the RO filter 100. Purified water flowing into the water storage tank 200 may be provided to the RO filter 100 as flushing water. The water storage tank 200 may include a housing that is not elastic (non-elastic housing). This water storage tank 200 may include a separator membrane 210, a purified water storage unit 220, and a raw water storage unit 230.

The separator membrane 210 may be made of a non-permeable material to prevent water from penetrating, have elasticity, and independently partition the purified water storage unit 220 and the raw water storage unit 230. Due to this separator membrane 210, the purified water storage unit 220 can contract when the raw water storage unit 230 expands, and the raw water storage unit 230 can contract when the purified water storage unit 220 expands. The separator membrane 210 may be accommodated in a non-elastic housing.

The purified water storage unit 220 may store purified water flowing in the purified water storage passage 340 of the flow channel 300 as flushing water and provide the stored purified water (flushing water) to the RO filter 100 through a second tank passage 320 of the flow channel 300, which will be described later. Additionally, the purified water storage unit 220 may discharge the stored purified water to the outside through a purified water discharge passage 360 of the flow channel 300, which will be described later. When purified water flows into the purified water storage unit 220 and the purified water storage unit 220 expands, the raw water storage unit 230 may contract. In addition, when raw water flows into the raw water storage unit 230 and the raw water storage unit 230 expands, the purified water storage unit 220 may contract and the purified water in the purified water storage unit 220 may be discharged into the second tank flow passage 320.

The raw water storage unit 230 stores raw water flowing in a first tank passage 310 of the flow channel 300, which will be described later, and discharges the stored raw water to the outside through a raw water discharge passage 380 of the flow channel 300. When raw water flowing through the first tank flow passage 310 flows into the raw water storage unit 230 and the raw water storage unit 230 expands, the purified water storage unit 220 may contract. In addition, when purified water flows into the purified water storage unit 220 and the purified water storage unit 220 expands, the raw water storage unit 230 may contract and the raw water in the raw water storage unit 230 may be discharged into the raw water discharge passage 380.

The flow channel 300 provides passages through which raw water and purified water can flow between the purified water storage unit 220, the raw water storage unit 230, and the RO filter 100. The flow channel 300 may include the first tank passage 310, the second tank passage 320, the RO filter inflow passage 330, the purified water storage passage 340, the residential water discharge passage 350, the purified water discharge passage 360, a return passage 370, and the raw water discharge passage 380.

The first tank passage 310 may provide a passage through which raw water flowing from the outside of the water purifier 1 flows into the raw water storage unit 230. Additionally, the first tank passage 310 may provide a passage through which raw water flows into the raw water storage unit 230 without passing through the pump 500 and the RO filter 100. Additionally, the first tank passage 310 may communicate with the RO filter inflow passage 330 to exchange raw water. In other words, raw water flowing in the first tank passage 310 can flow into the RO filter inflow passage 330. For example, the first tank passage 310 may be disposed between the raw water storage unit 230 and the RO filter inflow passage 330.

The second tank passage 320 may provide a passage through which purified water discharged from the purified water storage unit 220 can flow. Additionally, the second tank passage 320 may be joined to the RO filter inflow passage 330. In other words, purified water flowing through the second tank passage 320 can flow into the RO filter inflow passage 330. In the figures according to the present embodiment, the first tank passage 310 and the second tank passage 320 are directly joined to the RO filter inflow passage 330 at different points, but the spirit of the present invention is not necessarily limited thereto. Rather, they may be joined through the other configuration, and the first tank passage 310 and the second tank passage 320 may be joined at one point. For example, the second tank passage 320 may be disposed between the purified water storage unit 220 and the RO filter inflow passage 330.

The RO filter inflow passage 330 may provide a passage through which water flows into the non-filtering unit 120 of the RO filter 100. The water flowing within the RO filter inflow passage 330 may be any one of raw water, purified water, and residential water depending on a flow mode (purified water discharge mode, flushing mode, or purified water storage mode). The RO filter inflow passage 330 may communicate with the filter inlet 140 of the RO filter 100.

The purified water storage passage 340 may provide a passage through which purified water discharged from the filtering unit 130 of the RO filter 100 flows into the purified water storage unit 220 or purified water discharged from the purified water storage unit 220 flows into the purified water discharge passage 360. Additionally, the purified water storage passage 340 may be connected to the second tank passage 320 and the purified water discharge passage 360. In other words, the purified water discharged from the RO filter 100 may be provided to the purified water storage unit 220 through the purified water storage passage 340 and the second tank passage 320. Additionally, purified water discharged from the purified water storage unit 220 may flow into the purified water discharge passage 360 through the second tank passage 320 and the purified water storage passage 340. The purified water storage passage 340 may directly communicate with the RO filter 100 and communicate with the purified water storage unit 220 through the second tank passage. However, since the spirit of the present invention is not necessarily limited thereto, the purified water storage passage 340 may be connected between the purified water discharge passage 360 and the second tank passage 320 to communicate with the RO filter 100 and the purified water storage unit 220 through the purified water discharge passage 360 and the second tank passage 320, or may directly communicate with the purified water storage unit 220.

The residential water discharge passage 350 may provide a passage through which residential water or flushing discharge water discharged from the non-filtering unit 120 of the RO filter 100 flows. In other words, the residential water discharge passage 350 may be connected to the residential water outlet 160. The residential water or flushing discharge water in the non-filtering unit 120 of the RO filter 100 can be discharged to the outside through the residential water discharge passage 350. Additionally, the residential water discharge passage 350 may be joined to the return passage 370 to return residential water to the non-filtering unit 120. In other words, at least some of the residential water may flow into the RO filter inflow passage 330 through the residential water discharge passage 350 and the return passage 370. Additionally, the residential water discharge passage 350 may be joined to the raw water discharge passage 380.

The purified water discharge passage 360 may provide a passage through which purified water discharged from the filtering unit 130 of the RO filter 100 discharges to the outside of the water purifier 1. In other words, the purified water discharge passage 360 may be connected to the purified water storage passage 340.

The return passage 370 may provide a passage for returning at least some of the water discharged from the non-filtering unit 120 of the RO filter 100 to the non-filtering unit 120 of the RO filter 100. In other words, at least some of the purified water and residential water discharged from the non-filtering unit 120 may reflow into the non-filtering unit 120 through the return passage 370. For example, the return passage 370 may be connected between the residential water discharge passage 350 and the RO filter inflow passage 330.

The raw water discharge passage 380 may provide a passage for discharging raw water discharged from the raw water storage unit 230 to the outside. This raw water discharge passage 380 may be connected between the first tank passage 310 and the residential water discharge passage 350.

The valve unit 400 may include a plurality of valve modules selectively opened and closed to control the flow of raw water and purified water in the flow channel 300. For example, in a case in which the flow channel 300 includes the first tank passage 310, the second tank passage 320, the RO filter inflow passage 330, the purified water storage passage 340, the residential water discharge passage 350, the purified water discharge passage 360, and the return passage 370 as described above, the valve unit 400 can control the flow of water by opening/closing each passage included in the flow channel 300.

Some of the plurality of valve modules may be 3-way valves provided at points where passages branch and merge to flow raw water and purified water, but the spirit of the present invention is not limited thereto. Although a first valve module 410 is provided as a 3-way valve at the point where the tank passage 310 and the RO filter inflow passage 330 are joined in FIG. 1, for example, a general opening/closing valve may be provided in each of the tank passage 310 and the RO filter inflow passage 330 instead of the 3-way valve.

The plurality of valve modules may include the first valve module 410, a second valve module 420, a third valve module 430, a fourth valve module 440, a fifth valve module 450, a sixth valve module 460, a seventh valve module 470, an eighth valve module 480, and a ninth valve module 490.

The first valve module 410 can open/close the first tank passage 310 such that raw water flows into the raw water storage unit 230 or flows into the RO filter 100. In other words, the first valve module 410 may open the first tank passage 310 such that raw water flowing through the RO filter inflow passage 330 flows into the first tank passage 310. Additionally, the first valve module 410 may close the first tank passage 310 to prevent raw water from the RO filter inflow passage 330 from flowing into the first tank passage 310. For example, the first valve module 410 may be provided as a 3-way valve at the point where the RO filter inflow passage 330 and the first tank passage 310 are joined. Further, the first valve module 410 and the raw water storage unit 230 may be connected by the first tank passage 310.

The second valve module 420 can open/close the second tank passage 320 such that purified water discharged from the RO filter 100 flows into the purified water storage unit 220 or purified water discharged from the purified water storage unit 220 flows into the RO filter 100. In other words, the second valve module 420 may open the second tank passage 320 such that purified water discharged from the purified water storage unit 220 and flowing through the second tank passage 320 flows into the RO filter inflow passage 330, and close the purified wave storage passage 340. In addition, the second valve module 420 may open the purified water storage passage 340 and the second tank passage 320 such that purified water flowing in the purified water storage passage 340 flows into the purified water storage unit 220 or purified water discharged from the purified water storage unit 220 flows into the purified water storage passage 340. For example, the second valve module 420 may be provided as a 3-way valve at the point where the purified water storage passage 340 is joined to the second tank passage 320.

The third valve module 430 can open/close the second tank passage 320 such that purified water flows into the RO filter 100 or raw water flows into the RO filter 100. In other words, the third valve module 430 may open the second tank passage 320 such that purified water flowing in the second tank passage 320 flows into the RO filter inflow passage 330. Additionally, the third valve module 430 may close the second tank passage 320 such that raw water flows into the RO filter 100. For example, the third valve module 430 may be provided as a 3-way valve at the point where the second tank passage 320 is joined to the RO filter inflow passage 330. Additionally, the purified water storage unit 220 and the third valve module 430 may be connected by the second tank passage 320.

The fourth valve module 440 can open/close the purified water discharge passage 360 such that purified water flows into the purified water storage unit 220 or is discharged to the outside of the water purifier 1. In other words, the fourth valve module 440 may close the purified water discharge passage 360 such that purified water discharged from the RO filter 100 flows into the purified water storage unit 220 through the purified water storage passage 340. Additionally, the fourth valve module 440 may open the purified water discharge passage 360 such that the purified water discharged from the RO filter 100 is discharged to the outside of the water purifier 1 through the purified water discharge passage 360. For example, the fourth valve module 440 may be provided as a 3-way valve at the point where the purified water discharge passage 360 is joined to the purified water storage passage 340.

The fifth valve module 450 can open/close the residential water discharge passage 350 and the return passage 370 such that residential water discharged from the RO filter 100 is discharged to the outside of the water purifier 1 or flows into the RO filter 100. In other words, the fifth valve module 450 may open the residential water discharge passage 350 and the return passage 370 such that at least some of the residential water flowing in the residential water discharge passage 350 flow to the RO filter inflow passage 330 through the return passage 370 and the remainder flows to the outside of the water purifier 1. In addition, the fifth valve module 450 may open the residential water discharge passage 350 and close the return passage 370 such that flushing discharge water discharged from the RO filter 100 is discharged to the outside of the water purifier 1. For example, the fifth valve module 450 may be provided as a 3-way valve at the point where the return passage 370 is joined to the residential water discharge passage 350. Additionally, the residential water outlet 160 and the fifth valve module 450 may be connected by the residential water discharge passage 350.

The sixth valve module 460 can open/close the purified water discharge passage 360 such that purified water in the flow channel 300 is discharged to the outside of the water purifier 1. In other words, the sixth valve module 460 can provide purified water to users by opening the purified water discharge passage 360. Additionally, the purified water storage passage 340 and the sixth valve module 460 may be connected by the purified water discharge passage 360.

The seventh valve module 470 can open/close the RO filter inflow passage 330 and the return passage 370 such that residential water and raw water flowing through the RO filter inflow passage 330 are mixed. For example, the seventh valve module 470 may be provided as a 3-way valve at the point where the return passage 370 is joined to the RO filter inflow passage 330. Additionally, the fifth valve module 450 and the seventh valve module 470 may be connected by the return passage 370.

The eighth valve module 480 may be provided in the first tank passage 310 and operate to allow raw water to flow into the raw water storage unit 230 or to allow raw water discharged from the raw water storage unit 230 to flow to the raw water discharge passage 380. In other words, the eighth valve module 480 may close the raw water discharge passage 380 such that raw water flowing in the first tank passage 310 flows into the raw water storage unit 230. Additionally, the eighth valve module 480 may open the raw water discharge passage 380 such that raw water discharged from the raw water storage unit 230 flows into the raw water discharge passage 380. For example, the eighth valve module 480 may be provided as a 3-way valve at the point where the raw water discharge passage 380 is joined to the tank passage 310. The raw water discharge passage 380 can be connected between the first tank passage 310 and the residential water discharge passage 350 through the eighth valve module 480.

The ninth valve module 490 can open/close the residential water discharge passage 350 and the raw water discharge passage 380 such that residential water or raw water is discharged to the outside of the water purifier 1. For example, the ninth valve module 490 may be provided as a 3-way valve at the point where the raw water discharge passage 380 is joined to the residential water discharge passage 350.

The pump 500 may pressurize at least one of raw water and residential water such that at least one of the raw water and the residential water can pass through the reverse osmosis membrane 110 and pressurize purified water to the RO filter 100. Additionally, the pump 500 may be connected to the RO filter inflow passage 330 to pressurize raw water, purified water, and residential water flowing through the RO filter inflow passage 330. This pump 500 may be provided at a location between the third valve module 430 and the RO filter 100 or between the seventh valve module 470 and the RO filter 100, which is downstream a location where the first valve module 410 and the third valve module 430 are provided on the basis of the direction in which raw water flows toward the RO filter 100 within the RO filter inflow passage 330.

The preprocessing filter 600 can filter raw water flowing into the water purifier 1 before the row water flows into the RO filter 100. In other words, the preprocessing filter 600 can preprocess the raw water to be supplied to the RO filter 100 and the water storage tank 200. This preprocessing filter 600 may be connected to the RO filter inflow passage 330.

The postprocessing filter 700 can re-filter the purified water filtered in the RO filter 100 before discharging it to the outside of the water purifier 1. In other words, the postprocessing filter 700 can postprocess the purified water discharged from the purified water storage unit 220. This postprocessing filter 700 may be connected to the purified water discharge passage 360. For example, the postprocessing filter may be connected to the purified water discharge passage 360 so as to be located between the fourth valve module 440 and the sixth valve module 460.

The flow sensor 800 can detect a flow rate of raw water or purified water. A user can predict a replacement time of the RO filter 100 through the flow rate detected by the flow sensor 800. For example, the flow sensor 800 may be connected to the purified water discharge c passage 360 to detect the flow rate of purified water.

The control device 900 can control opening and closing of the plurality of valve modules on the basis of a plurality of flow modes. The control device 900 may be implemented by an arithmetic device including a microprocessor, a memory, and the like. Since the implementation method is obvious to those skilled in the art, further detailed description will be omitted. The plurality of flow modes may include a flushing mode, a purified water storage mode, and a purified water discharge mode.

Figure 2:
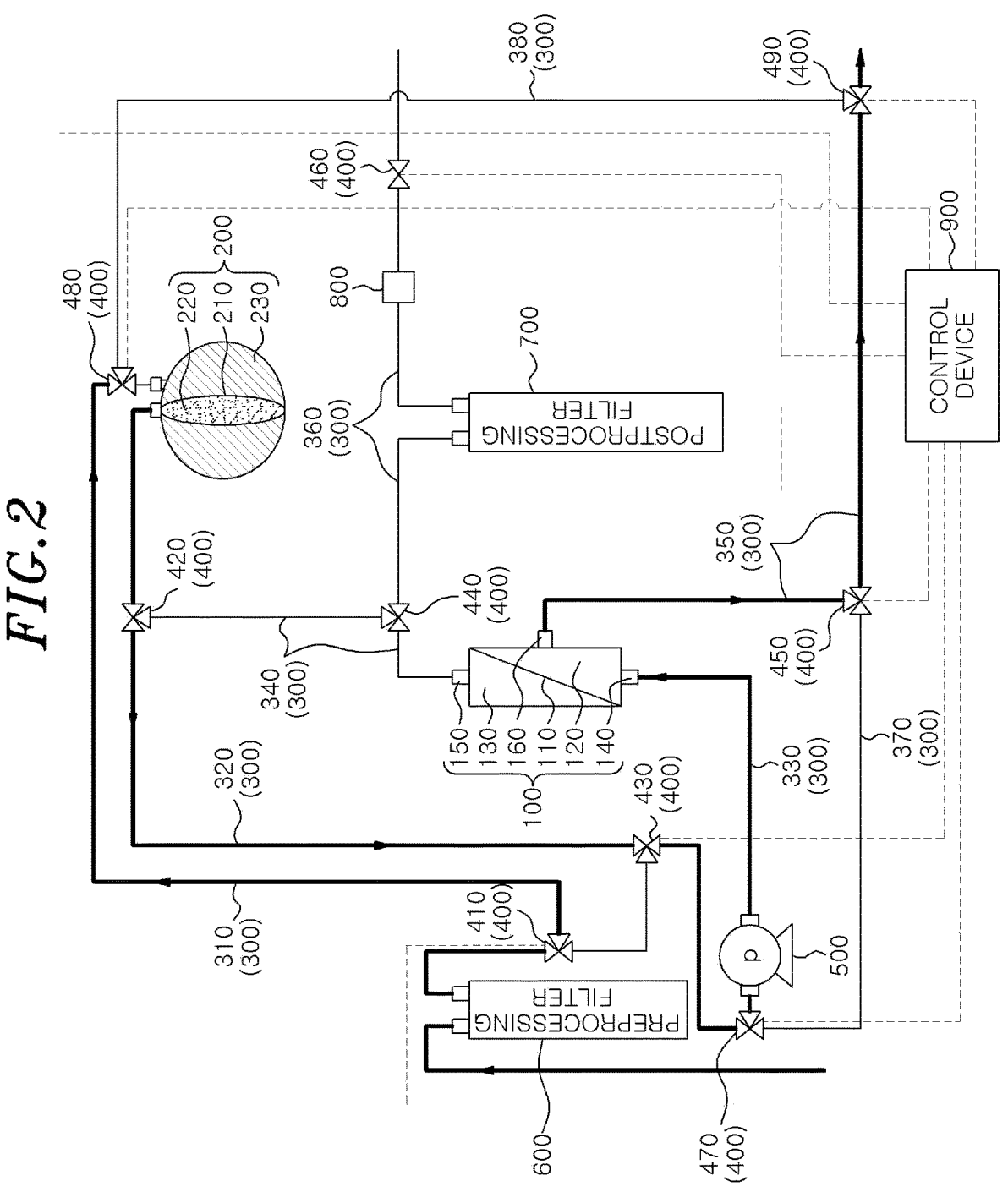
FIG. 2 is a diagram showing flow paths of raw water and purified water in a flushing mode in FIG. 1.

The flushing mode will be described with reference to FIG. 2. The flushing mode is a mode in which the reverse osmosis membrane 110 can be cleaned with purified water from the purified water storage unit 220. In the flushing mode, the control device 900 may control passage opening/closing of the plurality of valve modules such that raw water flows into the raw water storage unit 230 of the water storage tank 200 and purified water discharged from the purified water storage unit 220 flows into the non-filtering unit 120 of the RO filter 100. In other words, in the flushing mode, the control device 900 may control the first valve module 410, the second valve module 420, and the third valve module 430 such that the first tank passage 310, the second tank passage 320, and the RO filter inflow passage 330 are opened and the purified water storage passage 340 is closed.

In addition, in the flushing mode, the control device 900 may control passage opening/closing of the plurality of valve modules such that flushing discharge water discharged from the non-filtering unit 120 of the RO filter 100 is discharged to the outside of the water purifier 1 through the residential water discharge passage 350. In other words, in the flushing mode, the control device 900 can control the fifth valve module 450 and the ninth valve module 490 such that the residential water discharge passage 350 is opened and the return passage 370 is closed. When the flushing mode ends, purified water can be accommodated in the non-filtering unit 120.

In the flushing mode, the pump 500 can pressurize the purified water discharged from the purified water storage unit 220 to the RO filter 100.

Figure 3:
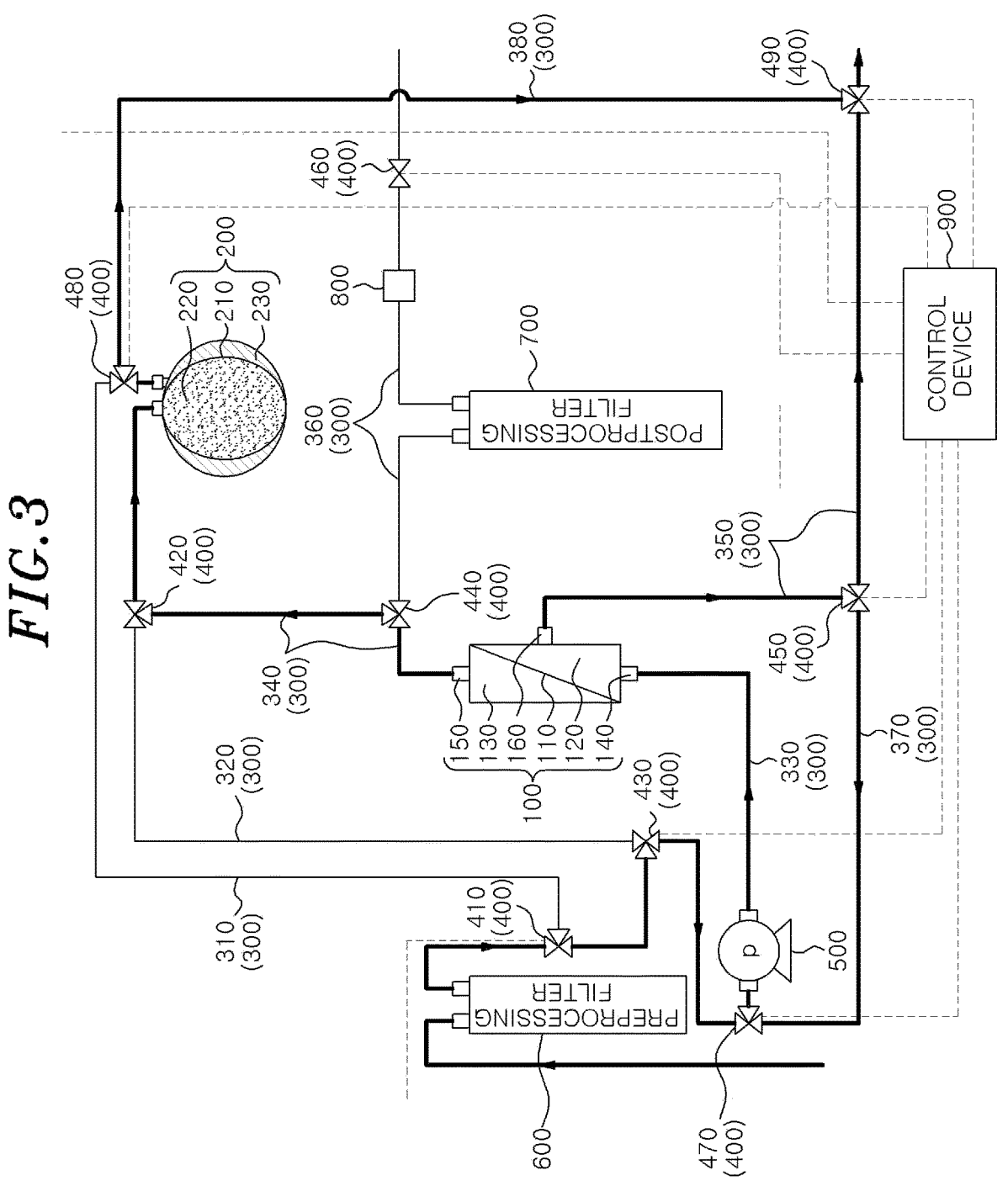
FIG. 3 is a diagram showing flow paths of raw water and purified water in a purified water storage mode in FIG. 1.

The purified water storage mode will be described with reference to FIG. 3. The purified water storage mode is a mode in which purified water to be used in the flushing mode or purified water discharge mode is stored in the purified water storage unit 220. In this purified water storage mode, the control device 900 can control passage opening/closing of the plurality of valve modules such that raw water flows into the non-filtering unit 120 of the RO filter 100. In other words, in the purified water storage mode, the control device 900 can control the first tank passage 310 and the second valve module 420 such that the first tank passage 310 and the second tank passage 320 are blocked from the RO filter inflow passage 330.

In addition, in the purified water storage mode, the control device 900 can control opening/closing of the plurality of valve modules such that the purified water discharged from the filtering unit 130 of the RO filter 100 is stored in the purified water storage unit 220 through the purified water storage passage 340. In other words, in the purified water storage mode, the control device 900 can control the second valve module 420 and the fourth valve module 440 such that the purified water discharge passage 360 is closed and the purified water storage passage 340 and the second tank passage 320 communicate with each other.

In addition, in the purified water storage mode, the control device 900 can control passage opening/closing of the plurality of valve modules such that water discharged from the RO filter 100 is discharged to the outside or at least some thereof flows through the residential water discharge passage 350 and the RO filter inflow passage 330 into the non-filtering unit 120 of the RO filter 100 along with raw water. In other words, in the purified water storage mode, the control device 900 can control the fifth valve module 450, the seventh valve module 470, and the ninth valve module 490 such that the RO filter inflow passage 330, the residential wave discharge passage 350, and the return passage 370 are opened.

Additionally, the control device 900 can perform the purified water storage mode after the flushing mode. At the initial stage of the purified water storage mode, purified water may be discharged from the non-filtering unit 120. The purified water discharged from the non-filtering unit 120 may flow back into the RO filter 100 through the return passage 370. In other words, the purified water discharged from the non-filtering unit 120 may flow into the non-filtering unit 120 along with raw water in the purified water storage mode. Additionally, in the purified water storage mode, the control device 900 may control passage opening/closing of the plurality of valve modules such that raw water discharged from the raw water storage unit 230 is discharged to the outside through the raw water discharge passage 390. In other words, in the purified water storage mode, the control device 900 can control the eighth valve module 480 and the ninth valve module 490 such that the raw water discharge passage 380 is opened. In the purified water storage mode, the pump 500 can pressurize the raw water that has flowed into the RO filter 100 such that the raw water passes through the reverse osmosis membrane 110.

Figure 4:
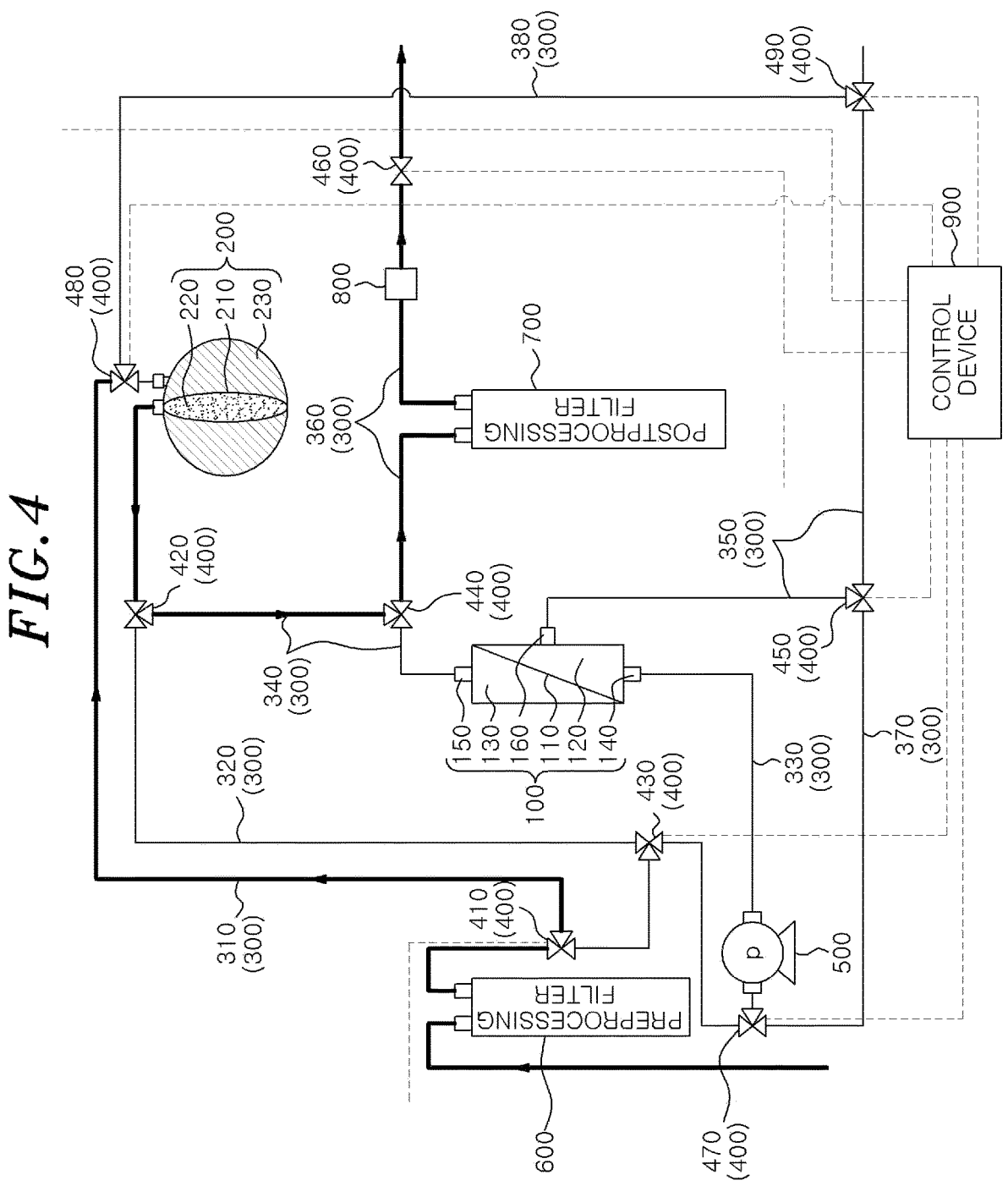
FIG. 4 is a diagram showing flow paths of raw water and purified water in a purified water discharge mode in FIG. 1.

The purified water discharge mode will be described with reference to FIG. 4. The purified water discharge mode is a mode in which the purified water stored in the purified water storage unit 220 can be discharged to the outside and provided to users. In this purified water discharge mode, the control device 900 can open/close the plurality of valve modules such that raw water flow into the raw water storage unit 230 and purified water discharged from the purified water storage unit 220 which contracts according to expansion of the raw water storage unit 230 is discharged to the outside. In other words, raw water can flow into the raw water storage unit 230 without passing through the RO filter 100. In the purified water discharge mode, the control device 900 can control the first valve module 410, the third valve module 430, and the eighth valve module 480 such that the RO filter inflow passage 330 communicates with the first tank passage 310, the RO filter inflow passage 330 and the second tank passage 320 are blocked from each other, and the row water discharge passage 380 is closed.

Additionally, in the purified water discharge mode, the control device 900 may control opening/closing of the plurality of valve modules such that the purified water discharged from the purified water storage unit 220 is discharged to the outside. In other words, in the purified water discharge mode, the control device 900 can control the second valve module 420, the fourth valve module 440, and the sixth valve module 460 such that the second tank passage 320 communicates with the purified water storage passage 340 and the purified water discharge passage 360 is opened.

Hereinafter, the effect and operation of the water purifier 1 according to an embodiment of the present invention will be described.

The water purifier 1 according to an embodiment of the present invention can efficiently clean the reverse osmosis membrane 110 of the RO filter 100 by flowing raw water and purified water on the basis of a plurality of flow modes. Additionally, since the reverse osmosis membrane 110 is cleaned with purified water in the flushing mode, impurities can be prevented from being adsorbed on the reverse osmosis membrane 110 of the RO filter 100 in the flushing mode.

In the flushing mode, as raw water flows into the raw water storage unit 230, the purified water in the purified water storage unit 220 can be discharged to the RO filter 100, and thus the purified water can flow into the RO filter 100 or can be discharged to the outside without a separate pump.

In addition, since residential water can be recirculated to the RO filter and filtered into purified water, wasted water can be recycled.

In addition, during the initial operation of the purified water storage mode, purified water discharged from the non-filtering unit 120 of the RO filter 100 can flow back into the non-filtering unit 120 through the return passage, and thus the concentration of contaminants in incoming raw water can be reduced. In other words, according to the present embodiments, during the initial operation of the purified water storage mode, the RO filter 100 filters water which is a mixture of purified water in the non-filtering unit 120 and raw water flowing into the RO filter 100, and thus a filtration load applied to the RO filter 100 can be lowered.

In addition, since the purified water in the purified water storage unit 220 can be provided to users using raw water flowing into the raw water storage unit 230 in the purified water discharge mode, the flow rate of raw water flowing into the raw water storage unit 230 may be the same as or similar to the flow rate of raw water discharged therefrom. In other words, according to the present embodiments, it is possible to prevent an unnecessarily large amount of raw water from being consumed to discharge purified water.

Although embodiments of the present invention have been described above as specific embodiments, this is merely an example, and the present invention is not limited thereto and should be construed as having the widest scope following the technical idea disclosed in this specification. A person skilled in the art may implement a pattern of a shape not specified by combining/substituting the disclosed embodiments, but this also does not depart from the scope of the present invention. In addition, a person skilled in the art can easily change or modify the embodiments disclosed based on the present specification, and it is clear that such changes or modifications also fall within the scope of the present invention.

What is claimed is:

1. A water purifier comprising:

A reverse osmosis (RO) filter including a non-filtering unit into which raw water flows, a filtering unit for discharging purified water, and a reverse osmosis membrane that partitions the non-filtering unit and the filtering unit and filters the raw water into the purified water;

A raw water storage unit in which the raw water is stored; a purified water storage unit in which the purified water discharged from the filtering unit is stored;

A water storage tank including a separator membrane made of a non-permeable material to independently partition the raw water storage unit and the purified water storage unit and having elasticity, the water storage tank being configured such that the purified water storage unit contracts when the raw water storage unit expands and the raw water storage unit contracts when the purified water storage unit expands;

A flow channel providing passages through which the raw water and the purified water flow, the flow channel further including;

An RO filter inflow passage providing a passage through which any one of the raw water or the purified water flows into the non-filtering unit;

A first tank passage providing a passage through which the raw water flows into the raw water storage unit;

A second tank passage providing a passage through which the purified water discharged from the purified water storage unit flows in, the second tank passage being joined to the RO filter inflow passage;

A purified water storage passage providing a passage through which the purified water discharged from the filtering unit flows in, and the purified water storage passage being joined to the second tank passage; and A purified water discharge passage providing a passage through which the purified water is discharged from the purified water storage unit and discharged to the outside, and the purified water discharge passage being joined to the purified water storage passage;

A valve unit including a plurality of valve modules selectively opened/closed to control flow of the raw water and the purified water in the flow channel; and A control device for controlling opening/closing of the plurality of valve modules based on a plurality of flow modes, Wherein the plurality of flow modes includes a purified water storage mode in which the purified water is stored in the purified water storage unit, Wherein the plurality of valve modules is opened/closed such that the raw water flows into the non-filtering unit and the purified water discharged from the filtering unit flows into the purified water storage unit in the purified water storage mode.

2. The water purifier of claim 1, wherein the plurality of flow modes further includes a purified water discharge mode in which the purified water stored in the purified water storage unit is discharged to the outside, wherein the plurality of valve modules is opened/closed such that the raw water flows into the raw water storage unit, and the purified water storage unit contracts due to expansion of the raw water storage unit and thus the purified water discharged from the purified water storage unit is discharged to the outside in the purified water discharge mode, and the raw water flows into the raw water storage unit without passing through the RO filter in the purified water discharge mode.

3. The water purifier of claim 1, wherein the flow channel further includes a raw water discharge passage providing a passage through which the raw water is discharged from the raw water storage unit and discharged to the outside in the purified water storage mode.

4. The water purifier of claim 3, wherein the flow channel further includes a residential water discharge passage providing a passage for discharging residential water discharged from the non-filtering unit, the residential water discharge passage being joined to the raw water discharge passage.

5. The water purifier of claim 1, wherein the plurality of flow modes further includes a flushing mode in which the reverse osmosis membrane is cleaned with the purified water stored in the purified water storage unit, and wherein the plurality of valve modules is opened/closed such that the raw water flows into the raw water storage unit and the purified water discharged from the purified water storage unit flows into the non-filtering unit in the flushing mode.

6. The water purifier of claim 1, further comprising a pump provided on the RO filter inflow passage to pressurize the raw water flowing in the RO filter inflow passage.

7. The water purifier of claim 5, wherein the flow channel includes a return passage for returning water discharged from the non-filtering unit of the RO filter to the non-filtering unit, the purified water is accommodated in the non-filtering unit in a case in which the flushing mode ends, the purified water storage mode is performed after the flushing mode, and the plurality of valve modules is opened/closed such that the purified water is discharged from the non-filtering unit and flows into the non-filtering unit along with the raw water through the return passage in the purified water storage mode.

* * * * *